No. 865,258. PATENTED SEPT. 3, 1907.
H. M. LAMBERT.
CAR FENDER.
APPLICATION FILED MAY 31, 1907.
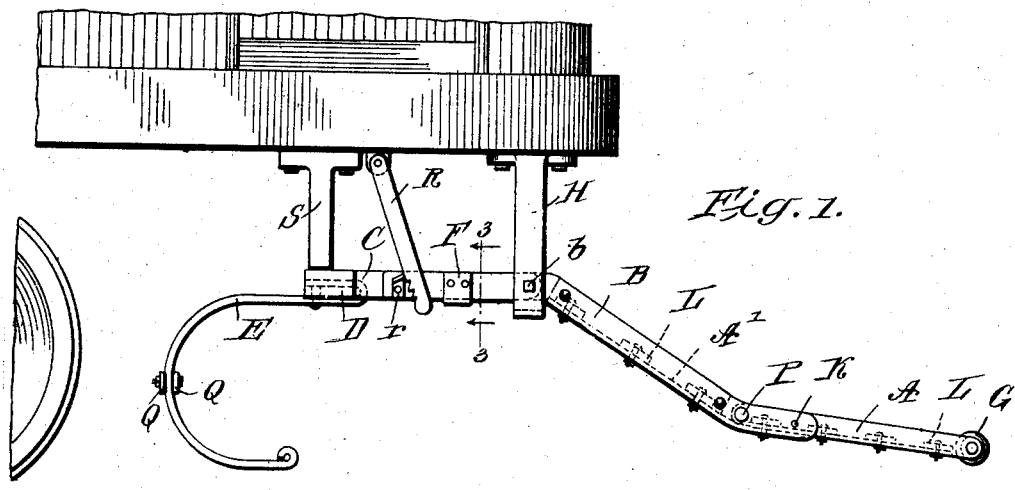
*Fig. 1.*
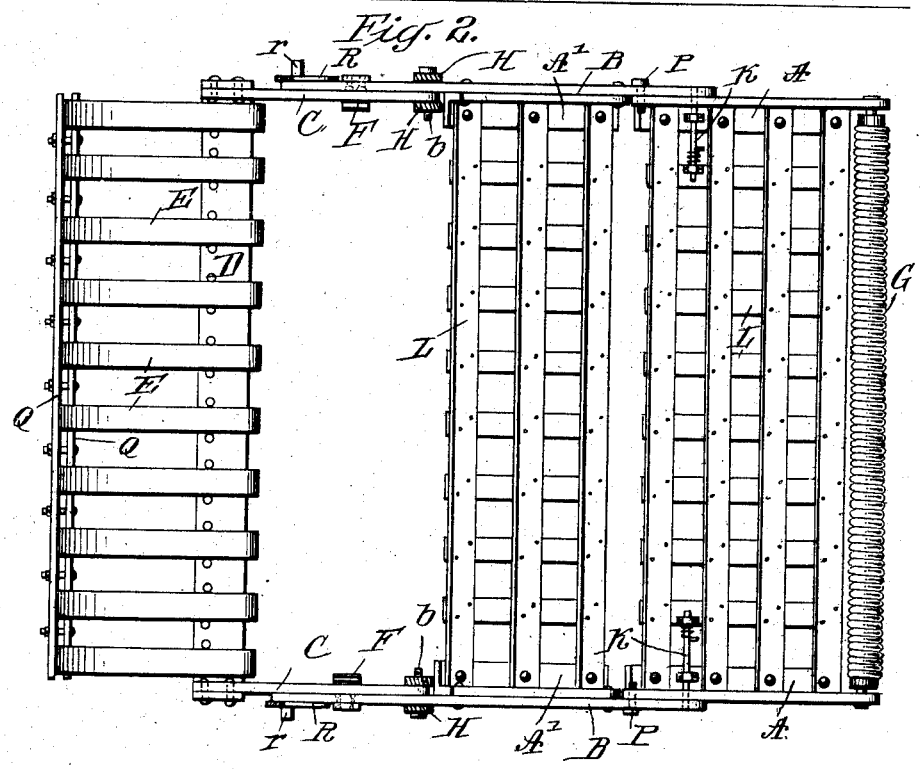
*Fig. 2.*
*Fig. 3.*
WITNESSES
Samuel E. Wade
Chas. A. Pettit
INVENTOR
HENRY M. LAMBERT.
BY Munn & Co.
ATTORNEYS.

UNITED STATES PATENT OFFICE.

HENRY M. LAMBERT, OF PORTLAND, OREGON.

CAR-FENDER.

No. 865,258.   Specification of Letters Patent.   Patented Sept. 3, 1907.

Application filed May 31, 1907. Serial No. 376,673.

*To all whom it may concern:*

Be it known that I, HENRY M. LAMBERT, a citizen of the United States, and a resident of Portland, in the county of Multnomah and State of Oregon, have invented a new and useful Improvement in Car-Fenders, of which the following is a specification.

This invention relates to car fenders and has for its object to provide a simple and efficient device characterized particularly by the fact that two fenders or catchers are provided, one behind the other, the fore fender being particularly adapted and intended to catch a standing person, and the latter a person lying on the track, the arrangement being such that the fore fender will lift on passing over a recumbent body and will allow the rear fender to drop to the track and drag along the same, preventing the body from passing under the wheels. The front fender is also constructed so that it can be readily folded out of the way, as when two cars are to be coupled.

The invention is illustrated in the accompanying drawings, in which,

Figure 1 is a side elevation of the fender applied to a car platform. Fig. 2 is a top plan of the fender. Fig. 3 is a section on line 3—3 of Fig. 1.

The fenders are supported by hangers H, depending from the car platform, at each side thereof. The front fender comprises angle bars A, A', at each side, to which are fixed cross slats or lattice work L. This fender is formed in two sections which are foldable with respect to each other, one section, that having the side bars A', being fixed to the supporting levers B, and the other section, having the side bars A, being pivoted to the levers B at P. The front section also has a roller G between the front ends of its side bars, with rubber hose wrapped spirally around the same. A spring bolt K works through the side bar A at each side, and into the ends of the lever B, and locks said parts together and prevents fold of the front section, unless released.

The levers B are pivoted at *b* to the hangers H, and so the front fender may swing up or down to the extent permitted by the devices hereinafter described.

The rear or drop fender consists of a series of curved springs E, fixed at the upper end to accross plate D and secured at the middle by clamp bars Q, bolted together. The plate D is upset at the ends and bolted to the rear ends of the side bars C which are pivoted at their front ends to the hangers H by the same pins *b* that attach the front fender thereto. The levers B have hooked lugs F behind the pivot and these lugs engage under the bars C and act to support said bars and also to prevent drop of the levers in front. The rear ends of the bars C stop against a stop block S, fixed to the under side of the car platform, which prevents undue lift of the bars C and drop of the levers B.

R indicates a latch bar pivoted to the under side of the platform and hanging down beside the lever B, in position to engage a lug *r* on said lever when the rear end thereof is lowered, thereby holding the front fender in elevated position.

In normal position, the excess of weight forward of the pivot *b* lifts the rear fender and lowers the front fender to the extent permitted by the stop S, and when a standing person is struck he will fall on the front fender and be caught thereby. On striking a body lying on the track, the front fender will ride up over the same, dropping the rear ends of the levers B and allowing the rear fender to drop to the ground and when so dropped it is held down by engagement of the latch R at each side, and the body will be caught and carried along in the rear fender and prevented from passing under the wheels.

I claim:

1. The combination with hangers under a car platform, of levers at each side, pivoted to the hangers, a front fender carried by the front arms of the levers, a rear fender having side bars pivoted to the hangers, and hooked lugs on the rear arms of the levers, engaging and supporting said side bars and rear fender, the excess of weight being on the front arms of the levers.

2. The combination with side supports connected to the car platform, of a folding fender formed in front and rear sections, the rear section being fixed to the supports and the front section being pivoted thereto, and a latch engaging between the supports and the front section, to lock the latter against movement.

3. The combination with hangers under a car platform, of a forefender pivotally connected to the hangers and having levers extending rearwardly thereof, a rear curved fender having bars at the top pivoted at their front end to the hangers, supporting devices attached to the levers and engaging the said bars, and a latch pivoted under the car platform and hanging beside the rear ends of the levers and arranged to engage the same and hold said ends depressed when the front fender is lifted.

HENRY M. LAMBERT.

Witnesses:
A. W. LIVINGSTON,
GLEN A. DE GROFF.